Figure 1:
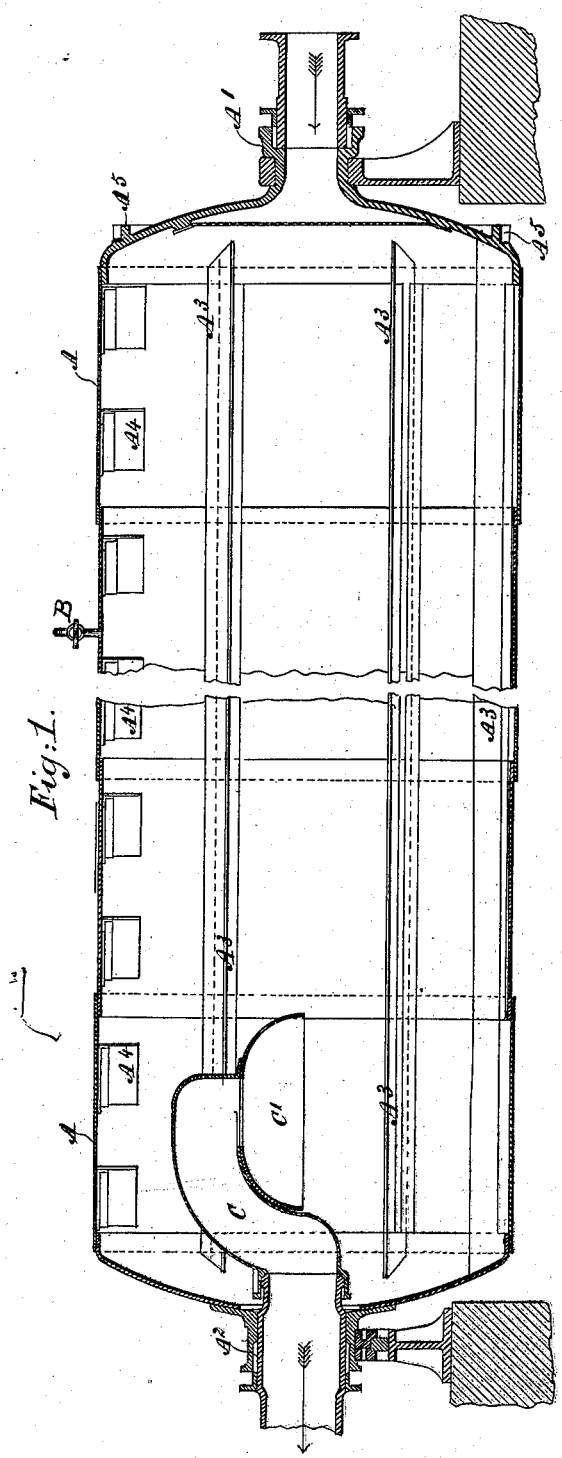

(No Model.)

W. ANDERSON.
FILTERING APPARATUS.

No. 322,148. Patented July 14, 1885.

Witnesses
E. D. Davidson
Allan McLane Abert

William Anderson
Inventor
by his Attorney
Baldwin, Hopkins & Payton

N. PETERS, Photo-Lithographer, Washington, D. C.

United States Patent Office.

WILLIAM ANDERSON, OF WESTMINSTER, ENGLAND.

FILTERING APPARATUS.

SPECIFICATION forming part of Letters Patent No. 322,148, dated July 14, 1885.

Application filed October 24, 1884. (No model.) Patented in England November 23, 1883, No. 5,496; in France September 13, 1884, No. 164,261, and in Belgium October 6, 1884, No. 66,507.

*To all whom it may concern:*

Be it known that I, WILLIAM ANDERSON, a subject of the Queen of Great Britian, residing at 3 Whitehall Place, in the city of Westminster, England, have invented certain new and useful Improvements in the Purification of Water, (for which I have obtained Letters Patent in Great Britain, dated November 23, 1883, No. 5,496; in France, dated September 13, 1884, No. 164,261, and in Belgium, dated October 6, 1884, No. 66,507;) and I do hereby declare that the following is a full, clear, and exact description of the invention, which will enable others skilled in the art to which it appertains to make and use the same.

This invention relates to the treatment of water by means of metallic iron. The method at present adopted when so-called "spongy" iron is used, is to pass the water through layers of the purifying material arranged like an ordinary filter-bed; but in many cases, notably where spongy iron is used with bad water, the purifying material gets covered with slime, cakes into lumps, and has to be disturbed and cleaned from time to time. Moreover, the process of purification by percolation being very slow, large areas of filters are required and a heavy capital-expenditure in the purifying material.

The proposed method consists in placing the so-called spongy iron, or iron in the form of scrap or turnings, in a revolving vessel of suitable size, but so as not nearly to fill it, and passing the water to be purified through the hollow trunnions, in at one end and out of the other. The inside of the vessel may be fitted with shelves or ledges to cause the material to be carried up and caused to fall through the water, thus constantly exposing fresh surfaces. The rubbing of the particles of iron against each other as the vessel revolves serves to keep them clean and in an active condition.

In order more effectually to prevent the finer particles of the iron being carried forward by the current of water out of the rotating apparatus, which is liable to occur when the current of water is rapid, unless the outlet-passage, which is through the axis, be made inconveniently large, I apply a trunk passing into the interior of the cylinder through the hollow axis. Within the cylinder the trunk is caused to curve upward, and at its end it is expanded to a hood-like form, and it terminates in a mouth of large area directed downward. This mouth is of such dimensions that the current of water passing through it to the outlet is comparatively slow, so much so as to be incapable of carrying the iron in an upward direction in direct opposition to the force of gravity. As the water ascends in the hood-like appendage to the trunk the rapidity of the current increases, and it flows away through the trunk with considerable rapidity. By this arrangement I avoid the necessity otherwise found to give unduly large dimensions to the outlet through the axis in order to prevent the iron being washed out of the apparatus.

In order that my said invention may be most fully understood and readily carried into effect, I will proceed to described the drawings hereunto annexed.

Figure 2:
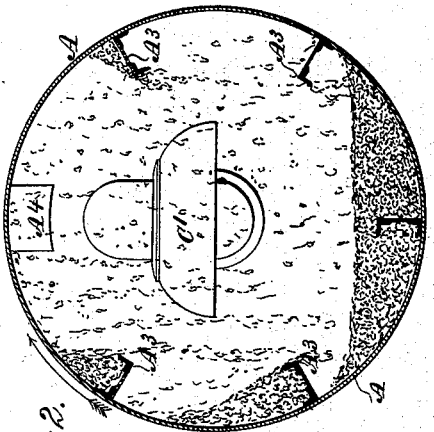
Figure 3:
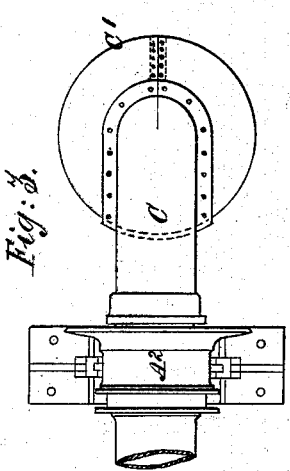

In the drawings, Figure 1 is a vertical section of an apparatus for the purification of water in accordance with my invention. Fig. 2 is a transverse section of the same. Fig. 3 is a plan of the trunk and some other parts.

The apparatus consists of a cylinder, A, mounted so as to revolve about horizontal axes or trunnions $A'$ $A^2$. These trunnions at their ends serve one of them as the water-inlet and the other as the outlet. At the inlet end of the apparatus the velocity of the incoming water is checked by a baffle-plate, as shown; or the same object may be attained by means of a perforated plate or strainer. The cylinder contains within it shelves $A^3$ $A^3$, and these, as the cylinder rotates, lift the iron and then allow it to fall down through the water to the bottom of the cylinder. One of these shelves is divided up into a series of sections, $A^4$ $A^4$, and these are set in a somewhat oblique position with the object to counteract any tendency there may be for the iron to travel along the cylinder with the current of water from the inlet to the outlet end. It will be seen that when, during the rotation of the cylinder, the shelf-sections $A^4$ act upon the material it will be lifted by them and carried upward to some extent, sliding off from the sections toward the inlet end of the cylinder. This operation of the inclined shelf-sections moves the material in a direction the opposite to that in which it is moved by the current of water, the result being that injurious accumulation of material at or near the discharge end of the cylinder is avoided. Rotation may be imparted to the cylinder A in any convenient manner.

The drawings represent a ring of teeth at A⁵, by way of which motion is to be given to the cylinder in obvious manner.

C is the trunk entering into the cylinder. For convenience of fixing, it is made in parts, as the drawings represent. The trunk remains stationary while the cylinder revolves, and a tight joint is formed around the trunk by packing applied in the usual manner within the trunnion A².

C' is a hood-like appendage of the trunk. It is approximately semi-globular in form and open on the under side. This opening is the mouth or entrance to the trunk, and it is directed downward, so that full advantage is taken of the gravitation of the particles to prevent them passing away. At the top of the part C' the opening, by which the water ascending through the mouth enters the part of the trunk marked C, is of much smaller dimensions than the lower opening or mouth.

With an apparatus such as the drawings show, and having a cylinder five feet in diameter, a circumferential speed of five feet per minute will be suitable. Such an apparatus will be capable of purifying many hundred gallons of water per minute; but this will depend to some extent upon the quality of the water supplied to the apparatus and the standard of purification to which it is desired to attain. With very impure water—such as sewage—the quantity purified will be much less. The cylinder should be provided with an air-cock, B, by opening which air is permitted to escape from time to time as it accumulates.

I would have it understood that I can employ any metallic iron which is in a state of division such as to present a large surface to contact with the water, and such as to admit of its being conveniently worked in the apparatus described. A material suited for the purpose may be obtained by the reduction of an oxide ore of iron by heating it, when in admixture with carbonaceous matter, to a temperature sufficient to effect the reduction without causing agglomeration.

Having thus described the nature of my said invention, and the manner of performing the same, I would have it understood that I claim—

1. The apparatus for the purification of water by means of iron, consisting of a cylinder revolving upon trunnions, which form the inlet and outlet passages, and with shelves lifting the iron and then allowing it to descend through the water, substantially as described.

2. The combination, with a rotary apparatus for the purification of water, of a trunk projecting through the hollow axis into the interior of the rotating vessel and terminating in a mouth of large area, through which the water in passing out of the apparatus has to descend, substantially as described.

WILLIAM ANDERSON.

Witnesses:
JNO. DEAN,
JOS. LAKE,
*Both of 17 Gracechurch St., London.*